(12) United States Patent
Smith

(10) Patent No.: US 7,188,807 B2
(45) Date of Patent: Mar. 13, 2007

(54) REFUELING BOOMS WITH MULTIPLE COUPLINGS AND ASSOCIATED METHODS AND SYSTEMS

(75) Inventor: Jerell L. Smith, Seattle, WA (US)

(73) Assignee: The Boeing Company, Seattle, WA (US)

( * ) Notice: Subject to any disclaimer, the term of this patent is extended or adjusted under 35 U.S.C. 154(b) by 268 days.

(21) Appl. No.: 11/078,210

(22) Filed: Mar. 11, 2005

(65) Prior Publication Data

US 2006/0214059 A1 Sep. 28, 2006

(51) Int. Cl.
*B64D 39/00* (2006.01)

(52) U.S. Cl. .................... 244/135 A; 141/98; 141/231; 141/387

(58) Field of Classification Search ............ 244/135 A, 244/135 R; 141/98, 231, 387
See application file for complete search history.

(56) References Cited

U.S. PATENT DOCUMENTS

| 4,150,803 | A | 4/1979 | Fernandez |
| 5,131,438 | A | 7/1992 | Loucks |
| 5,141,178 | A | 8/1992 | Alden et al. |
| 5,255,877 | A | 10/1993 | Lindgren et al. |
| 5,393,015 | A | 2/1995 | Piasecki |
| 5,427,333 | A | 6/1995 | Kirkland |
| 5,539,624 | A | 7/1996 | Dougherty |
| 5,573,206 | A | 11/1996 | Ward |
| 5,785,276 | A | 7/1998 | Ruzicka |
| 5,810,292 | A | 9/1998 | Garcia, Jr. et al. |
| 5,904,729 | A | 5/1999 | Ruzicka |
| 5,906,336 | A | 5/1999 | Eckstein |
| 5,921,294 | A | 7/1999 | Greenhalgh et al. |
| 5,996,939 | A | 12/1999 | Higgs et al. |
| 6,119,981 | A | 9/2000 | Young et al. |
| 6,145,788 | A | 11/2000 | Mouskis et al. |
| 6,324,295 | B1 | 11/2001 | Valery et al. |
| 6,375,123 | B1 | 4/2002 | Greenhalgh et al. |

(Continued)

FOREIGN PATENT DOCUMENTS

DE 10013751 10/2001

(Continued)

OTHER PUBLICATIONS

Flug Revue, "Airbus (Air Tanker) A330-200 Tanker," Jan. 26, 2004; www.flug-revue.rotor.com/FRTypen/FRA3302T.htm; Motorp-Presse Stuttgart, Bonn, German, (5 pgs).

(Continued)

*Primary Examiner*—Galen Barefoot
(74) *Attorney, Agent, or Firm*—Perkins Coie LLP

(57) ABSTRACT

Refueling booms with multiple couplings, and associated methods and systems, are disclosed. A system in accordance with one embodiment of the invention includes a deployable boom carrying a refueling passage. A first coupler carried by the boom can be operatively coupleable to the refueling passage. The first coupler can be configured to be releasably connected to a receiver aircraft during refueling. A second coupler can be carried by the boom and can be operatively coupleable to the refueling passage, with the second coupler being configured to be releasably connected to a receiver aircraft during refueling. In particular embodiments, the first and second couplers can have different configurations so as to be compatible with aircraft having different refueling arrangements.

25 Claims, 3 Drawing Sheets

U.S. PATENT DOCUMENTS

| | | |
|---|---|---|
| 6,454,212 B1 | 9/2002 | Bartov |
| 6,464,173 B1 | 10/2002 | Bandak |
| 6,588,465 B1 | 7/2003 | Kirkland et al. |
| 6,598,830 B1 | 7/2003 | Ambrose et al. |
| 6,601,800 B2 | 8/2003 | Ollar |
| 6,604,711 B1 | 8/2003 | Stevens et al. |
| 6,651,933 B1 | 11/2003 | von Thal et al. |
| 6,669,145 B1 | 12/2003 | Green |
| 6,832,743 B2 | 12/2004 | Schneider et al. |
| 2003/0038214 A1 | 2/2003 | Bartov |
| 2003/0136874 A1 | 7/2003 | Gjerdrum |

FOREIGN PATENT DOCUMENTS

| | | |
|---|---|---|
| EP | 0807577 | 11/1997 |
| EP | 1094001 | 4/2001 |
| EP | 1361156 | 11/2003 |
| GB | 2373488 | 9/2002 |
| IT | 128459 | 5/2003 |
| RU | 2111154 | 5/1998 |
| RU | 2140381 | 10/1999 |
| RU | 2142897 | 12/1999 |
| TW | 386966 | 4/2000 |
| WO | WO-91/06471 | 5/1991 |
| WO | WO-97/33792 | 9/1997 |
| WO | WO-98/07623 | 2/1998 |
| WO | WO-98/39208 | 9/1998 |
| WO | WO-98/54053 | 12/1998 |
| WO | WO-02/24529 | 3/2002 |
| WO | WO-02/76826 | 10/2002 |
| WO | WO-03/102509 | 12/2003 |

OTHER PUBLICATIONS

Thales Avionics Ltd., "Air Tanker Bids for Future Strategic Tanker Aircraft," Jul. 3, 2001; www.thalesavionics.net/press/pr43.html; (3 pgs).

REFUELING BOOMS WITH MULTIPLE COUPLINGS AND ASSOCIATED METHODS AND SYSTEMS

TECHNICAL FIELD

The present invention is directed generally toward refueling booms with multiple couplings (e.g., for refueling different types of receiver aircraft), and associated methods and systems.

BACKGROUND

In-flight refueling (or air-to-air refueling) is an important method for extending the range of aircraft traveling long distances over areas having no feasible landing or refueling points. Although in-flight refueling is a relatively common operation, especially for military aircraft, the aircraft to be refueled (e.g., the receiver aircraft) must be precisely positioned relative to the tanker aircraft in order to provide safe engagement while the fuel is dispensed to the receiver aircraft. The requirement for precise relative spatial positioning of the two rapidly moving aircraft makes in-flight refueling a challenging operation.

There are currently two primary systems for in-flight refueling. One is a hose and drogue system, which includes a refueling hose having a drogue disposed at one end. The hose and drogue are deployed so as to trail behind the tanker aircraft when the aircraft is in flight. The pilot of the receiver aircraft flies the receiver aircraft to intercept and couple with the drogue for refueling.

Another in-flight refueling system is a boom refueling system. The boom refueling system typically includes a rigid boom that extends from the tanker aircraft and includes a probe and nozzle at its distal end. The boom also includes airfoils controlled by a boom operator stationed on the refueling aircraft. The airfoils allow the boom operator to actively maneuver the boom with respect to the receiver aircraft, which flies in a fixed refueling position below and aft of the tanker aircraft.

One drawback with the two refueling arrangements described above is that they tend to be mutually exclusive. The hose and drogue system includes a female receptacle that receives a male probe from the receiver aircraft, while the boom system includes a male probe that is received in a corresponding female receptacle of the receiver aircraft. Accordingly, tanker aircraft equipped with a hose and drogue refueling system are typically unable to supply fuel to a receiver aircraft that is configured to receive fuel from a boom system, and vice versa.

One approach to addressing the foregoing problem is to temporarily attach a "pigtail" to the end of a boom-based probe. The pigtail includes a relatively short, flexible hose segment and a drogue generally similar to a conventional drogue. In operation, a tanker aircraft that is fitted with a conventional refueling boom lands after refueling one or more aircraft that are compatible with the refueling boom. While the tanker aircraft is on the ground, it is outfitted with the removable pigtail. The tanker aircraft then takes off and is available to refuel other receiver aircraft that are compatible only with a hose and drogue system.

One drawback with the foregoing arrangement is that the tanker aircraft must land prior to changing over from a probe refueling system to a hose and drogue refueling system. Another drawback is that the foregoing system is not configured to allow tanker aircraft having a hose and drogue refueling arrangement to change over to a boom and probe refueling arrangement.

An approach to addressing the foregoing drawback is to outfit a tanker aircraft with multiple hoses and drogues, including at least one for generally small aircraft (typically located at the wing of the tanker aircraft), and one for larger aircraft (typically located at the fuselage of the tanker aircraft). One problem with this approach is that it requires several sets of hoses, pumps, reels, fuel routing arrangements and other support equipment, all of which occupy space and payload capacity that might otherwise be available for fuel. Another problem is that this arrangement does not allow a tanker aircraft configured with a boom and probe to refuel aircraft configured for hose and drogue refueling. Accordingly, still another approach to the foregoing problem is to outfit aircraft with both a fuselage-mounted boom and probe and one or more wing-mounted hose and drogue systems. While this approach allows a single tanker aircraft to refuel receiver aircraft having either a hose and drogue compatibility or a boom and probe compatibility, this approach is complicated and heavy, which reduces the operational efficiency of the tanker aircraft.

SUMMARY

The following summary is provided for the benefit of the reader only, and does not limit the invention as set forth by the claims. Aspects of the present invention are directed toward systems and methods for refueling aircraft in flight. An in-flight refueling system in accordance with one aspect of the invention includes a deployable boom carrying a refueling passage (e.g., a refueling conduit). The system further includes a first coupler carried by the boom and operatively coupleable to the refueling passage, with the first coupler being configured to be releasably connected to a receiver aircraft during refueling. The system can further include a second coupler carried by the boom and operatively coupleable to the refueling passage, with the second coupler also being configured to be releasably connected to a receiver aircraft during refueling.

In further particular aspects of the invention, the first and second couplers can be positioned so as to preclude simultaneous coupling to two corresponding receiver aircraft. The first coupler can be configured to be received at least partially within a corresponding receptacle of a receiver aircraft, and the second coupler can be configured to receive a corresponding connector of a receiver aircraft at least partially within the second coupler. The first coupler can be positioned below the second coupler, and a drive unit can selectively move one of the first and second couplers at a time between a stowed position and a deployed position.

An in-flight refueling system in accordance with another aspect of the invention includes a deployable boom that is elongated along a boom axis, carries a refueling passage, and has an external contour. The cross-sectional shape of the external contour can be elongated along a contour axis that extends generally transverse to the boom axis. For example, the external shape can be symmetric about the contour axis and can taper in an upward direction. At least one coupler can be carried by the boom and can be configured to be releasably connected to a receiver aircraft during refueling. In a further particular aspect of this system, the deployable boom can include a first portion and a second portion. The second portion can have the elongated cross-sectional shape and can be rotatable relative to the first portion about a rotation axis that is at least approximately aligned with the boom axis. The second portion can also be coupled to a boom steering control device. Accordingly, rotation of the second portion can be used to steer the boom to a desired position.

Further aspects of the invention are directed to methods for refueling aircraft in flight. One method includes deploying a generally rigid boom from a refueling aircraft, releasably connecting a first coupler carried by the boom to a first receiver aircraft, and refueling the first receiver aircraft via the first coupler. The method can further include releasing the connection between the first coupler and the first receiver aircraft, releasably connecting a second coupler carried by the boom to a second receiver aircraft, and refueling the second receiver aircraft via the second coupler. The method can further include releasing the connection between the second coupler and the second receiver aircraft.

Methods in accordance with further particular aspects of the invention can include connecting the second coupler without landing the aircraft between the time the connection between the first coupler and the first receiver aircraft is released, and the time the second coupler is connected. The method can also include releasably connecting the second coupler without stowing the boom between the time the connection between the first coupler and the first receiver aircraft is released, and the time the second coupler is connected.

DETAILED DESCRIPTION

The present disclosure describes refueling booms having multiple couplings for supplying fuel to receiver aircraft. The multiple couplings can include couplings configured for different types of receiver aircraft, including, but not limited to, aircraft configured to receive fuel via a boom and probe arrangement, as well as aircraft configured to receive fuel via a hose and drogue arrangement. Certain specific details are set forth in the following description and in FIGS. 1–5 to provide a thorough understanding of various embodiments of the invention. Well-known structures, systems and methods often associated with such systems have not been shown or described in detail to avoid unnecessarily obscuring the description of the various embodiments of the invention. In addition, those of ordinary skill in the relevant art will understand that additional embodiments of the invention may be practiced without several of the details described below.

Figure 1:
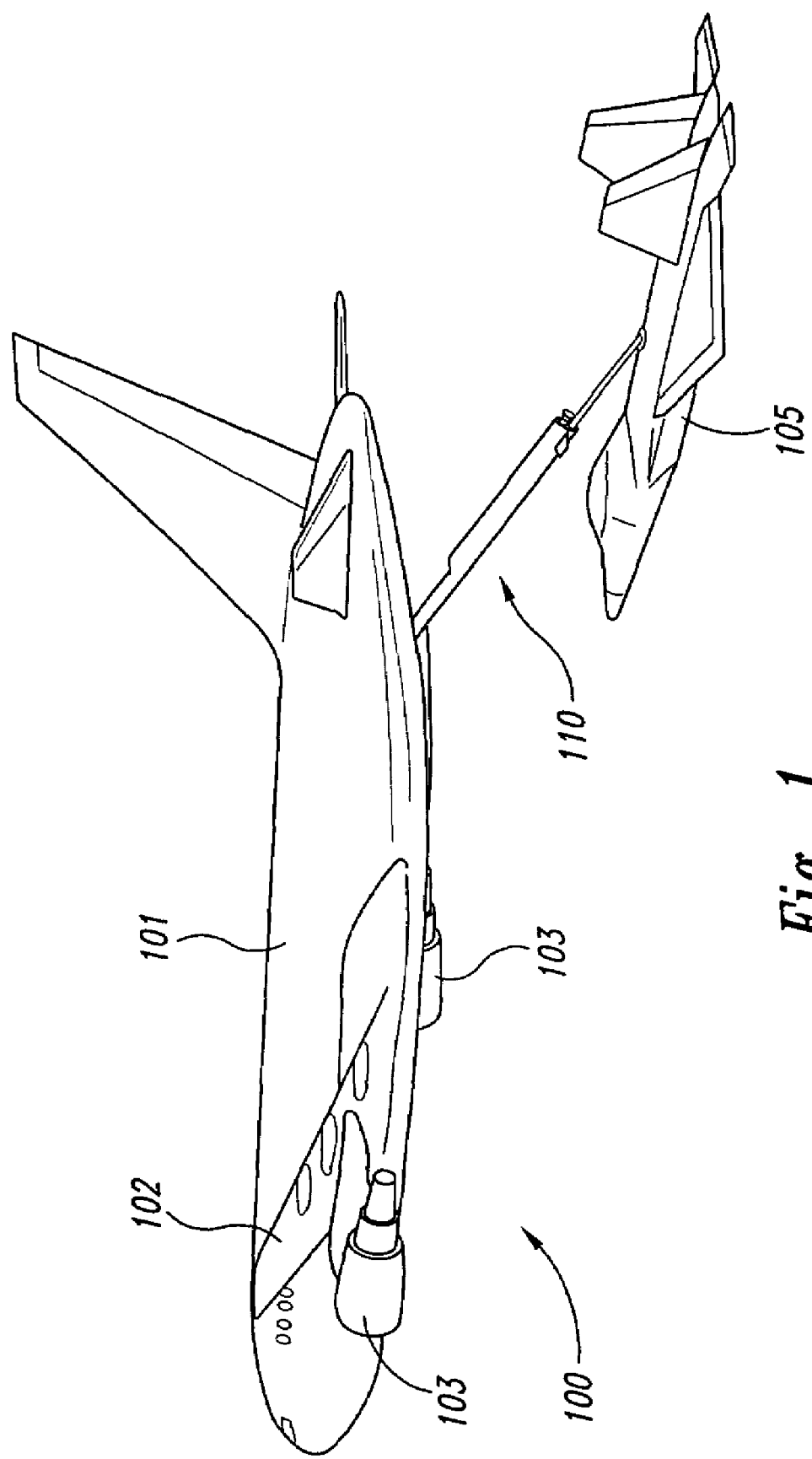
FIG. 1 is an isometric illustration of a tanker aircraft refueling a receiver aircraft with a refueling boom configured in accordance with an embodiment of the invention.

FIG. 1 illustrates a tanker aircraft 100 in the process of refueling a receiver aircraft 105 with a refueling boom 110 configured in accordance with an embodiment of the invention. The tanker aircraft 100 has a fuselage 101, wings 102, and one or more engines 103 (two are shown in FIG. 1 as being carried by the wings 102). In other embodiments, the aircraft 100 can have other configurations. In a particular aspect of the embodiment shown in FIG. 1, the boom 110 can be outfitted with multiple couplings, for example, to provide fuel to receiver aircraft having different refueling configurations. As described in greater detail below, each coupling can be selectively activated without landing the tanker aircraft 100, and without re-stowing the refueling boom 110. Accordingly, this arrangement can increase the efficiency with which fuel may be dispensed from a single tanker aircraft to multiple types of receiver aircraft.

Figure 2A:
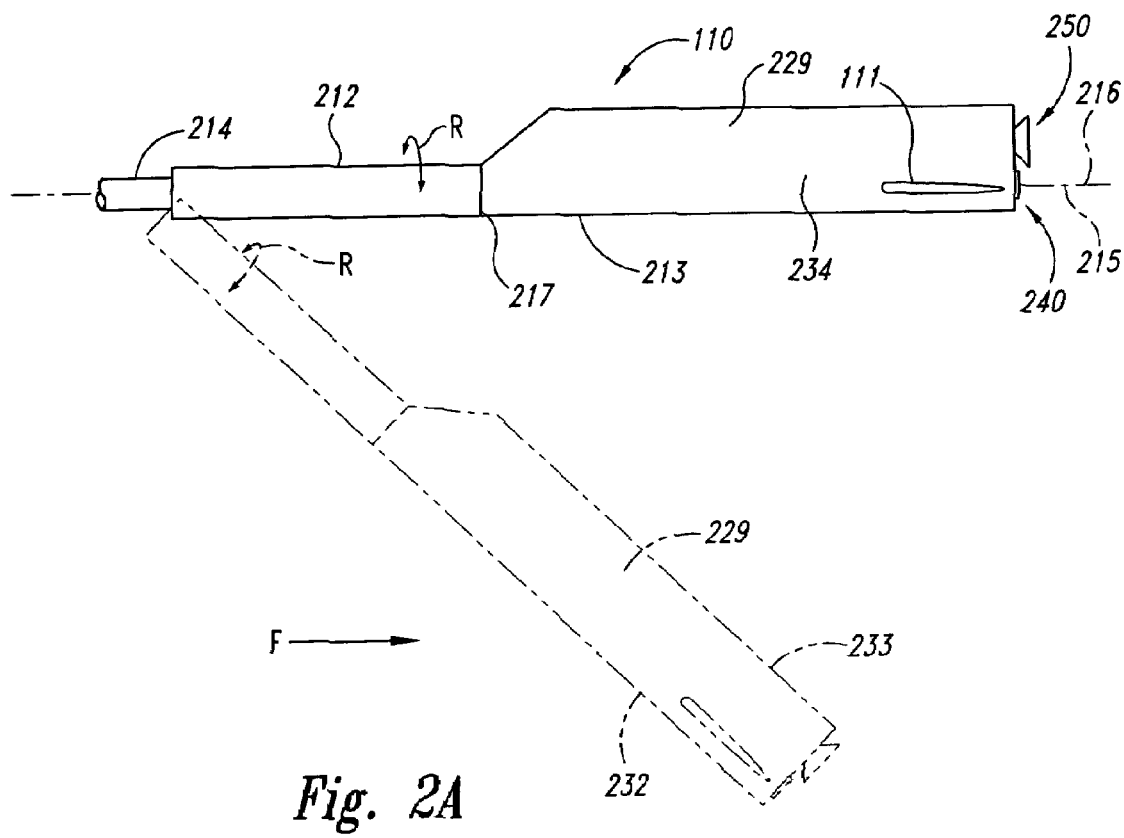
FIGS. 2A and 2B are side and end views, respectively, of a refueling boom configured in accordance with an embodiment of the invention.

FIG. 2A is a side elevation view of an end portion of the refueling boom 110 shown in FIG. 1. The boom 110 can be elongated along a boom axis 215 and can include at least two refueling couplers, shown in FIG. 2A as a first refueling coupler 240 and a second refueling coupler 250. The boom 110 can move between a stowed position (shown in solid lines) and a deployed position (shown in dashed lines). When the boom 110 is in the stowed position, the boom axis 215 is generally aligned with the adjacent free stream flow F. When the boom 110 is in the deployed position, the boom axis 215 is inclined relative to the free stream flow F.

The boom 110 can include a refueling passage 214 (e.g., a fuel line or conduit) that conducts fuel to the first coupler 240 or the second coupler 250. The first coupler 240 and the second coupler 250 can both be located in a housing 229. In a particular aspect of this embodiment, the boom 110 can include a first portion 212 and a second portion 213 coupled to the first portion 212 at a joint 217. The joint 217 can be located toward the distal end of the boom 110, or at any other suitable point between the tanker aircraft and the distal end. The second portion 213 can rotate relative to the first portion 212 about a rotation axis 216, as indicated by arrow R. The rotation axis 216 can be parallel to (or, as shown in FIG. 2A, coincident with) the boom axis 215. As described in greater detail below, rotating the second portion 213 relative to the first portion 212 can aid the operator in steering the boom 110 into alignment with a receiver aircraft. This steering function can optionally be aided by control surfaces 111 located on opposing sides of the boom 110. In any of these embodiments, the second portion 213 (and/or the control surfaces 111) can be operatively coupled to a controller 223 via which the operator can steer the boom 110.

Figure 2B:
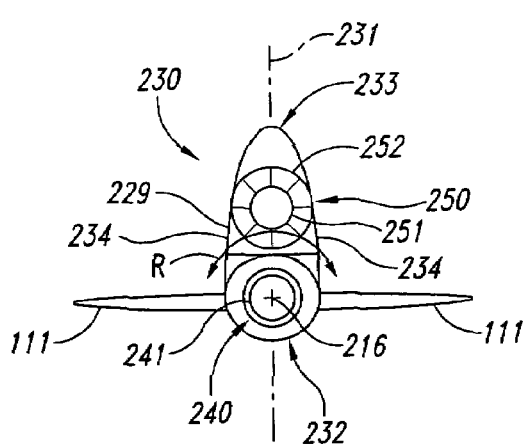

FIG. 2B is an end view of an embodiment of the boom 110 shown in FIG. 2A. The first coupler 240 can include a probe 241 configured to be received in a corresponding receptacle of a receiver aircraft. The second coupler 250 can include a hose 251 and a drogue 252 configured to engage a refueling probe of a receiver aircraft. The first coupler 240 and the second coupler 250 can be selectively deployed depending upon the type of refueling capability carried by the receiver aircraft. As is also shown in FIG. 2B, the housing 229 can have a cross-sectional shape 230 that is elongated along a major axis 231. In a particular aspect of this embodiment, the cross-sectional shape 230 of the housing 229 can be symmetric about the major axis 231, and can be tapered in a generally upwardly extending direction. Accordingly, the housing 229 can include a leading edge portion 232 and a trailing edge portion 233, and the cross-sectional shape 230 can allow the housing 229 to function as an airfoil. The airfoil can be symmetric, as shown in FIG. 2B, or asymmetric (e.g., cambered) in other embodiments.

Referring now to FIGS. 2A and 2B together, the external shape of the housing 229 can be used to both guide and stabilize the boom 110. For example, when the boom 110 is deployed into the freestream F (as indicated by dashed lines in FIG. 2A), the housing 229 can operate like a swept wing. If the boom 110 is rotated about the rotation axis 216 from the neutral position shown in FIGS. 2A and 2B (as indicated by arrow R), the airfoil shape of the housing 229 can provide forces that move the boom laterally (e.g., from left to right in FIG. 2B and into and out of the page in FIG. 2A). The boom operator can accordingly use the shape of the boom 110 to aid in positioning the boom 110 for refueling. In a particular aspect of this embodiment, the degree of control provided by rotating the second portion 213 of the boom 110 can eliminate the need for the control surfaces 111. In other embodiments, this arrangement can reduce the size of the control surfaces 111, which can be pitched upwardly and downwardly in a manner known to those of ordinary skill in the relevant art to position the boom 110. In a particular embodiment, the combination of the boom shape and the control surfaces 111 can provide multiple degrees of freedom by which to maneuver the boom 110.

When the boom 110 is moved to its stowed position (indicated by solid lines in FIG. 2A), the shape of the housing 229 can operate to stabilize the boom 110. For example, the relatively large laterally-facing surface area sections 234 of the housing 229 can allow the boom 110 to operate as a vane. Accordingly, the boom 110 will tend to automatically align with the freestream flow direction F. This effect can reduce the lateral loads on the support structure that carries the boom 110.

Figure 3:
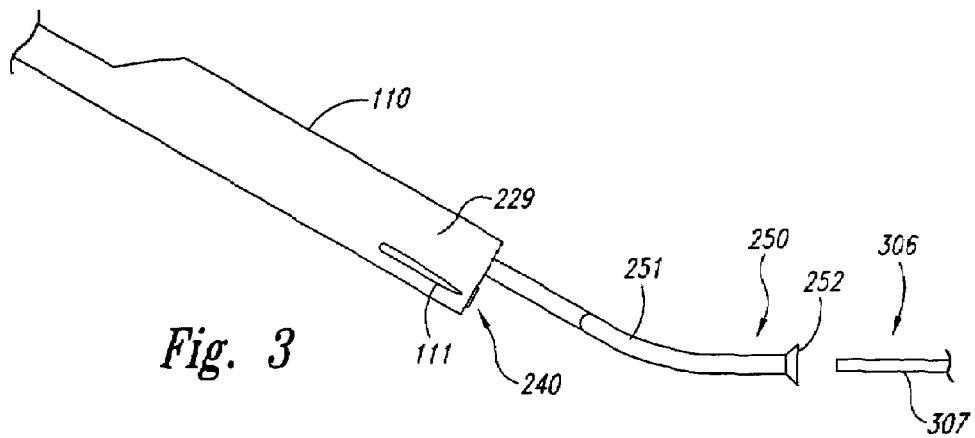
FIG. 3 is a side view of a boom having a first refueling coupler deployed in accordance with an embodiment of the invention.

FIG. 3 is a side elevation view of the boom 110 with the second coupler 250 moved from its stowed position to its deployed position. As shown in FIG. 3, the hose 251 and the drogue 252 are extended outwardly from the housing 229, while the first coupler 240 remains in its stowed position. With the second coupler 250 in its deployed position, the pilot of a receiver aircraft (not shown in FIG. 3) can position a corresponding receiver coupling 306 for attachment with the second coupler 250. In a particular aspect of this embodiment, the receiver coupling 306 can include a receiver probe 307 which the receiver aircraft pilot inserts into the drogue 252 for refueling. In one embodiment, the hose 251 and the drogue 252 can be left to trail behind the tanker aircraft while the pilot of the receiver aircraft maneuvers the receiver probe 307 into coupling position. This is a typical operational procedure for hose and drogue refueling arrangements. However, in another embodiment, the boom 110 can be positioned by a boom operator using the control surfaces 111, or rotation of the housing 229, or both, as described above with reference to FIGS. 2A–2B. In any of these embodiments, the second coupler 250 can be returned to its stowed position after use.

Figure 4:
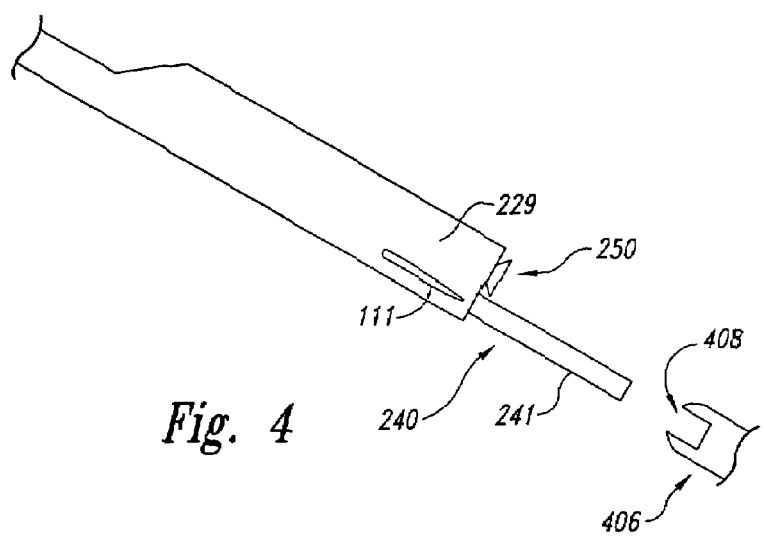
FIG. 4 is a side view of a refueling boom having a second refueling coupler deployed in accordance with another embodiment of the invention.

Referring now to FIG. 4, the first coupler 240 can be deployed in situations when it (rather than the second coupler 250) is compatible with the corresponding receiver aircraft. Accordingly, in one embodiment, the first and second couplers 240, 250 can be positioned so that only one coupler at a time can be deployed to refuel only one aircraft at a time. In other embodiments, the couplers 240, 250 can be arranged to be deployed simultaneously so as to refuel multiple aircraft simultaneously. In any of these embodiments, deploying the first coupler 240 can include extending the probe 241 from the housing 229 and into position for coupling with a receiver coupling 406 of the receiver aircraft (not shown in FIG. 4). The receiver coupling 406 can include a receptacle 408 into which the probe 241 is inserted for refueling. The motion of the boom 110 and therefore the probe 241 can be controlled and guided by a boom operator in any of the manners described above (e.g., by manipulating the control surfaces 111 and/or the housing 229).

Figure 5:
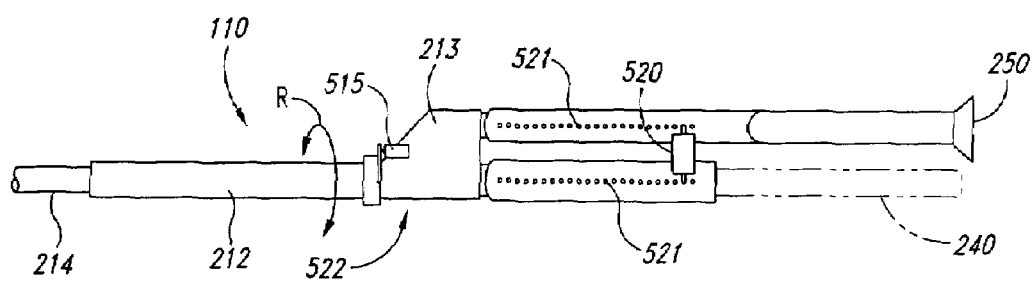
FIG. 5 is a side view of a boom illustrating a drive unit for moving multiple couplers in accordance with another embodiment of the invention.

FIG. 5 is a partially schematic illustration of the boom 110 with the housing 229 described above removed for purposes of illustration. The boom 110 can include a rotation actuator 515 operatively coupled between the second portion 213 and the first portion 212 to rotate the second portion 213 relative to the first portion 212, as indicated by arrow R. The rotation actuator 515 can include any suitable device, for example, a rotary hydraulic actuator, an electric motor, or a pneumatic actuator.

The boom 110 can also include one or more devices to move the first coupler 240 and the second coupler 250 between their respective deployed and stowed positions. In a particular embodiment shown in FIG. 5, a single drive unit 520 can independently move both the first coupler 240 and the second coupler 250. For example, the drive unit 520 can be carried by two parallel tracks 521, and can be selectively engaged with either the first coupler 240 or the second coupler 250. Accordingly, the drive unit 520 can include a mechanical and/or electromechanical clutch or other engagement mechanism that selectively engages one of the first and second couplers 240, 250 while the tanker aircraft is in flight. In an embodiment shown in FIG. 5, the drive unit 520 is operatively coupled to the second coupler 250 to deploy the second coupler 250, while the first coupler 240 remains in its stowed position. The first coupler 240 can be independently moved to its deployed position (as indicated by dashed lines in FIG. 5) when the second coupler 250 is moved to its stowed position. In a particular aspect of this embodiment, the drive unit 520 can include a lockout device that allows only one of the couplers 240, 250 to be deployed at any one time while the tanker aircraft is in flight. The lockout device can be overridden at other times, e.g., when the aircraft is on the ground and the boom 110 is being serviced.

The boom 110 can also include a valve 522 that selectively connects the fuel passage 214 with the appropriate coupler (e.g., either the first coupler 240 or the second coupler 250). Accordingly, the valve 522 can include any suitable device that connects the fuel passage 214 with one or the other of the first coupler 240 and the second coupler 250, while isolating the non-selected coupler from fluid communication with the fuel passage 214.

One feature of several of the foregoing embodiments described above with reference to FIGS. 1–5 is that the refueling boom 110 can include multiple couplers. In a particular aspect of these embodiments, the couplers are of different types (e.g., a probe type coupler, and a hose and drogue type coupler). Accordingly, the same boom and therefore the same tanker aircraft can easily be used to refuel receiver aircraft having different coupling arrangements. An advantage of this arrangement is that it can increase the versatility of the tanker aircraft. For example, in recent years, it has become increasingly common to deploy aircraft from different air forces on common missions. A tanker aircraft having a single type of configuration that is compatible with receiver aircraft having a variety of refueling configurations can significantly increase the efficiency with which refueling operations (and therefore flight operations generally) are carried out.

A further advantage of aspects of the foregoing arrangements is that boom 110 can be reconfigured from a probe configuration to a hose and drogue configuration by remote control, and without a significant impact to the normal flight operations of the tanker aircraft. In particular, this reconfiguration can take place without requiring that the tanker aircraft land, and, in a further particular embodiment, without requiring that the boom be re-stowed during the reconfiguration operation. This arrangement can increase the overall efficiency with which the tanker aircraft and receiver aircraft are operated, for example, by reducing the amount of time during which the tanker aircraft is not accessible for refueling. This arrangement can also reduce both the number of takeoffs and landings required by the refueling tanker, and the overall flight time required to refuel receiver aircraft having different configurations.

From the foregoing, it will be appreciated that specific embodiments of the invention have been described herein for purposes of illustration, but that various modifications may be made without deviating from the invention. For example, embodiments of the booms described above include two couplers, but can include more than two couplers in other embodiments. In still further embodiments, the booms can include multiple couplers of the same type, with each coupler providing redundancy for the other. The couplers can include probe type couplers, hose and drogue type couplers, or other couplers suitable for aircraft refueling. Aspects of the invention described in the context of particular embodiments may be combined or eliminated in other embodiments. For example, the tapered shape of the housing described above can be implemented on refueling booms having only one coupler, and/or on booms having more than two couplers. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

I claim:

1. An in-flight refueling system, comprising:
   a deployable boom carrying a refueling passage;
   a first coupler carried by the boom and operatively coupleable to the refueling passage, the first coupler being configured to be releasably connected to a receiver aircraft during refueling; and
   a second coupler carried by the boom and operatively coupleable to the refueling passage, the second coupler being configured to be releasably connected to a receiver aircraft during refueling.

2. The system of claim 1 wherein the boom includes a first portion and a second portion that is rotatable relative to the first portion, the second portion having a cross-sectional shape that is elongated and tapered, the second portion including a housing in which the first and second couplers are movably carried, and wherein the system further comprises:
   a drive unit operatively coupled to the first and second couplers, the drive unit being configured to selectively move one of the first and second couplers at a time between a stowed position and a deployed position; and
   an actuator operatively coupled between the first and second portions to rotate the second portion relative to the first portion about an axis generally aligned with the refueling line;
   wherein the first coupler is positioned below the second coupler and includes a probe configured to be received in a corresponding receptacle of a receiver aircraft; and
   wherein the second coupler is positioned above the first coupler and includes a hose and drogue, the hose being flexible, the drogue being configured to receive a probe of a receiver aircraft.

3. The system of claim 1 wherein the first and second couplers are positioned so as to preclude simultaneous coupling to two corresponding receiver aircraft.

4. The system of claim 1 wherein the first coupler is configured to be received at least partially within a corresponding receptacle of a receiver aircraft, and wherein the second coupler is configured to receive a corresponding connector of a receiver aircraft at least partially within the second coupler.

5. The system of claim 1 wherein at least a portion of the boom has a cross-sectional shape that is elongated and tapered in a generally upward direction.

6. The system of claim 1, further comprising an aircraft carrying the boom.

7. The system of claim 1, further comprising a valve carried by the boom, the valve being positioned to selectively couple the first coupler to the refueling passage in a first mode, and selectively couple the second coupler to the refueling passage in a second mode.

8. The system of claim 1 wherein the boom is elongated along a boom axis and includes a first portion coupleable to a refueling aircraft, and a second portion coupled to the first portion, the second portion carrying the first and second couplers and being rotatable relative to the first portion about an axis generally aligned with the boom axis.

9. The system of claim 1 wherein the first coupler and second coupler are connected to a common drive unit to move from a stowed position to a deployed position, and wherein the drive unit is configured to move one coupler at a time.

10. The system of claim 1 wherein the boom includes a housing and wherein at least one of the first and second couplers is movable relative to the housing between a stowed position and a deployed position, and wherein the at least one coupler is positioned to refuel a receiver aircraft when in the deployed position.

11. The system of claim 1 wherein:
    the first coupler include first means for coupling the refueling passage to a receiver aircraft during refueling; and
    the second coupler includes second means for coupling the refueling passage to a receiver aircraft during refueling.

12. An in-flight refueling system, comprising:
    a deployable boom carrying a refueling passage and being elongated along a boom axis, the boom having an external contour, and wherein a cross-sectional shape of the external contour is elongated along a contour axis extending generally transverse to the boom axis; and
    at least one coupler carried by the boom and configured to be releasably connected to a receiver aircraft during refueling.

13. The system of claim 12 wherein the at least one coupler includes a first coupler and a second coupler, and wherein the deployable boom includes a first portion and a second portion, the second portion having the elongated cross-sectional shape and being rotatable relative to the first portion about a rotation axis that is at least approximately aligned with the boom axis, the second portion including a housing in which the first and second couplers are movably carried, and wherein the system further comprises:
    a drive unit operatively coupled to the first and second couplers, the drive unit being configured to selectively move one of the first and second couplers at a time between a stowed position and a deployed position; and an actuator operatively coupled to between the first and second portions to rotate the second portion relative to the first portion about the rotation axis;

wherein the first coupler is positioned below the second coupler and includes a probe configured to be received in a corresponding receptacle of a receiver aircraft; and wherein the second coupler is positioned above the first coupler and includes a hose and drogue, the hose being flexible, the drogue being configured to receive a probe of a receiver aircraft.

14. The system of claim 12 wherein the cross-sectional shape is tapered in a direction generally aligned with the contour axis.

15. The system of claim 12 wherein the deployable boom includes a first portion and a second portion, the second portion having the elongated cross-sectional shape and being rotatable relative to the first portion about a rotation axis that is at least approximately aligned with the boom axis.

16. The system of claim 12 wherein the deployable boom includes a first portion and a second portion, the second portion having the elongated cross-sectional shape and being rotatable relative to the first portion about a rotation axis that is at least approximately aligned with the boom axis, and wherein the second portion is coupled to a boom steering control device.

17. The system of claim 12 wherein the cross-sectional shape is generally symmetric about the contour axis.

18. The system of claim 12, further comprising movable control surfaces coupled to the boom.

19. The system of claim 12 wherein the cross-sectional shape has a leading edge portion and a trailing edge portion, and wherein the leading edge portion is blunter than the trailing edge portion.

20. A method for refueling aircraft in flight, comprising:
deploying a generally rigid boom from a refueling aircraft;
releasably connecting a first coupler carried by the boom to a first receiver aircraft;
refueling the first receiver aircraft via the first coupler;
releasing the connection between the first coupler and the first receiver aircraft;
releasably connecting a second coupler carried by the boom to a second receiver aircraft;
refueling the second receiver aircraft via the second coupler; and
releasing the connection between the second coupler and the second receiver aircraft.

21. The method of claim 20 wherein refueling the first receiver aircraft includes refueling the first receiver aircraft with a first coupler having a first configuration and wherein refueling the second receiver aircraft includes refueling the second receiver aircraft with a second coupler having a second configuration different than the first configuration.

22. The method of claim 20 wherein releasably connecting the second coupler includes releasably connecting the second coupler without landing the aircraft between the time the connection between the first coupler and the first receiver aircraft is released and the time the second coupler is connected.

23. The method of claim 20 wherein releasably connecting the second coupler includes releasably connecting the second coupler without stowing the boom between the time the connection between the first coupler and the first receiver aircraft is released and the time the second coupler is connected.

24. The method of claim 20 wherein the boom is elongated along a boom axis and wherein the boom includes a first portion and a second portion that is rotatable relative to the first portion, the second portion having a cross-sectional shape that is elongated and tapered in a generally upward direction, the second portion including a housing in which the first and second couplers are movably carried, and wherein the method further comprises:
independently moving the first and second couplers between stowed and deployed positions with a common drive unit; and
rotating the second portion relative to the first portion about a rotation axis that is generally parallel to the boom axis to impart aerodynamic forces on the boom that move the boom toward a selected position;
wherein releasably connecting a first coupler includes releasably connecting a first coupler positioned below the second coupler and wherein releasably connecting a first coupler includes inserting a probe into a corresponding receptacle of the first receiver aircraft; and
wherein releasably connecting a second coupler includes deploying a flexible hose and drogue and receiving a probe of the second receiver aircraft in the drogue.

25. The method of claim 20, further comprising:
moving the first coupler from a stowed position to a deployed position prior to releasably connecting the first coupler;
moving the first coupler from the deployed position to the stowed position after releasing the connection between the first coupler and the first receiver aircraft;
moving the second coupler from a stowed position to a deployed position prior to releasably connecting the second coupler; and
moving the second coupler from the deployed position to the stowed position after releasing the connection between the second coupler and the second receiver aircraft.

* * * * *